United States Patent
Van Thiel et al.

(10) Patent No.: US 11,702,053 B2
(45) Date of Patent: Jul. 18, 2023

(54) ELECTROPNEUMATIC AXLE MODULATOR WITH DIRECTLY CONTROLLED VALVES

(71) Applicant: WABCO GmbH, Hannover (DE)

(72) Inventors: Julian Van Thiel, Großburgwedel (DE); Jan Gensink, Garbsen (DE)

(73) Assignee: ZF CV Systems Europe BV, Brussels (BE)

( * ) Notice: Subject to any disclaimer, the term of this patent is extended or adjusted under 35 U.S.C. 154(b) by 376 days.

(21) Appl. No.: 16/982,126

(22) PCT Filed: Mar. 22, 2019

(86) PCT No.: PCT/EP2019/057189
§ 371 (c)(1),
(2) Date: Sep. 18, 2020

(87) PCT Pub. No.: WO2019/192856
PCT Pub. Date: Oct. 10, 2019

(65) Prior Publication Data
US 2021/0101576 A1     Apr. 8, 2021

(30) Foreign Application Priority Data
Apr. 5, 2018  (DE) ...................... 10 2018 108 090.5

(51) Int. Cl.
*B60T 13/68*      (2006.01)
*B60T 13/26*      (2006.01)
(Continued)

(52) U.S. Cl.
CPC .......... *B60T 13/683* (2013.01); *B60T 13/268* (2013.01); *B60T 13/36* (2013.01); *B60T 13/662* (2013.01);
(Continued)

(58) Field of Classification Search
CPC ...... B60T 13/683; B60T 13/36; B60T 15/027; B60T 2270/88; B60T 17/221; B60T 13/268; B60T 13/662
See application file for complete search history.

(56) References Cited

U.S. PATENT DOCUMENTS 8,651,588 B2 * 2/2014 Bensch ................... B60T 8/327
                                                      303/7
10,946,848 B2 * 3/2021 Van Thiel ............. B60T 13/683
(Continued)

FOREIGN PATENT DOCUMENTS

DE        4132768 C1      10/1992
DE    102010010606 A1      9/2011
(Continued)

OTHER PUBLICATIONS

European Patent Office, Rijswijk, Netherlands, International Search Report of International Application No. PCT/EP2019/057189, dated Sep. 12, 2019, 2 pages.

*Primary Examiner* — Pamela Rodriguez
(74) *Attorney, Agent, or Firm* — Dickinson Wright PLLC

(57) ABSTRACT

An electropneumatic brake control module (1) has a supply connection (2) for connecting a compressed air supply (3); a first wheel brake connection (4) and a second wheel brake connection (6); a pneumatically controlled inlet-outlet valve unit (8) for controlling a first brake pressure (PB1) at the first wheel brake connection (4) and a second brake pressure (PB2) at the second wheel brake connection (6), which is independent of the first brake pressure (PB1); and an electropneumatic pilot control unit (10) for controlling at least one main control pressure (PH) at a main valve (12) of the inlet-outlet valve unit (10). The main valve (12) of the inlet-outlet valve unit (10) is a pneumatically controllable 3/2-way valve (13) with a main valve control connection (12.4).

15 Claims, 2 Drawing Sheets

(51) Int. Cl.
  *B60T 13/36* (2006.01)
  *B60T 13/66* (2006.01)
  *B60T 15/02* (2006.01)
  *B60T 17/22* (2006.01)

(52) U.S. Cl.
  CPC .......... *B60T 15/027* (2013.01); *B60T 17/221* (2013.01); *B60T 2270/88* (2013.01)

(56) References Cited

U.S. PATENT DOCUMENTS

| | | | |
|---|---|---|---|
| 11,400,906 B2* | 8/2022 | Bensch | B60T 13/662 |
| 2020/0189550 A1* | 6/2020 | van Thiel | B60T 13/662 |
| 2021/0162974 A1* | 6/2021 | Van Thiel | B60T 13/261 |

FOREIGN PATENT DOCUMENTS

| | | |
|---|---|---|
| DE | 102014006614 A1 | 11/2015 |
| DE | 102015119136 A1 | 5/2017 |
| EP | 0345203 A2 | 12/1989 |

* cited by examiner

ELECTROPNEUMATIC AXLE MODULATOR WITH DIRECTLY CONTROLLED VALVES

TECHNICAL FIELD

The invention relates to an electropneumatic brake control module, with a supply connection for connecting a compressed air supply; a first wheel brake connection and a second wheel brake connection; a pneumatically controlled inlet-outlet valve unit for controlling a first brake pressure at the first wheel brake connection and a second brake pressure at the second wheel brake connection, which is independent of the first brake pressure; and an electropneumatic pilot control unit for controlling at least one main control pressure at a main valve of the inlet-outlet valve unit.

BACKGROUND

Such an electropneumatic brake control module is also referred to as a two-channel axle modulator and is used to output wheel-individual pressures between left and right wheels of an axle. They are used in both commercial vehicles and passenger vehicles.

A similar electropneumatic brake control module is known from DE 10 2010 010 606 A1. The pressure control device disclosed therein is characterized in that it contains a single relay valve, with a supply connection supplied by a supply pressure, a venting connection connected to a pressure sink, a control connection and at least two working connections, wherein the one working connection is assigned to at least one brake cylinder of a wheel of one vehicle side of the axle and the other working connection of the relay valve is assigned to at least one brake cylinder of a wheel of the other vehicle side of the axle; each working connection of the relay valve is connected to a 2/2-way valve which is directly or indirectly controlled by a control unit and assigned to one side of the vehicle, and which, depending on the control by the control unit, establishes a connection between the relevant working connection of the relay valve and the associated brake cylinder or blocks this connection, and further the control connection of the relay valve can be connected by means of a valve device formed by a 3/2-way solenoid valve or by two 2/2-way solenoid valves and controlled by means of the control unit either to a brake control pressure formed depending on a driver's braking demand, to a supply pressure of a pressure reservoir or to a pressure sink. The disadvantage of this solution is the relay valve, which requires a lot of installation space overall, and therefore there is a need to replace the relay valve.

A solution that does not require a relay valve is disclosed in DE 2014 006 614 A1. The pneumatic braking device for motor vehicles disclosed therein comprises at least one ventilation valve and a venting valve, electrically actuated activating means for activating the ventilation valve and/or the venting valve, control logic with means for generating a control signal for the activating means according to a setpoint value for the setpoint brake pressure, wherein the ventilation valve and its activating means are designed in such a way that the pneumatic pressure from the storage tank can be controlled directly to the respective wheel brake in the activated state of the ventilation valve and/or the venting valve discharges the brake pressure at the wheel brake directly to atmosphere when in the activated state. In the exemplary embodiment shown in DE 2014 006 614 A1, two 2/2-way valves that can be held pneumatically and a pilot control unit with two electrically switchable 3/2-way valves for the respective control of control pressures for the two 2/2-way valves are provided for a wheel brake (i.e. a left or right wheel brake). This solution, too, is expensive in terms of cost and installation space and there is a need to simplify it.

It is therefore an object of the present invention to provide a simple, cost optimized, and installation space optimized electropneumatic brake control module of the type mentioned above.

SUMMARY OF THE INVENTION

The invention achieves the object with an electropneumatic brake control module of the type mentioned above, in that the main valve of the inlet-outlet valve unit is a pneumatically controllable 3/2-way valve with a main valve control connection.

This can lead to a further simplification, since a total of a main valve, the pilot control unit belonging to this main valve as well as the corresponding end stages in the electronics can be omitted. The installation space can thus be reduced and at least two valves can be saved in total. The costs are also reduced by this.

In a first preferred embodiment, the main valve has a main valve supply connection connected to the supply connection, a main valve working connection for controlling a working pressure and a main valve venting connection connected to a vent. Preferably, the main valve is pressureless in a with the in a venting position, in which the main valve working connection is connected to the main valve venting connection.

Furthermore, it is preferred that the inlet-outlet valve unit has a first brake valve for controlling the first brake pressure and a second brake valve for controlling the second brake pressure. The first brake pressure may be provided, for example, for a right wheel and the second brake pressure for a left wheel of the same axle.

It is particularly preferred here that the first brake valve has a first brake valve connection connected to the main valve and a second brake valve connection connected to the first wheel brake connection; and the second brake valve has a third brake valve connection connected to the main valve and a fourth brake valve connection connected to the second wheel brake connection. In this way, the main valve can be used both for ventilating the first and second wheel brake connections and for venting the respective first and second wheel brake connections. If the main valve is placed in a ventilation position, the first and second brake valves can be used to influence whether and the extent to which the first or second wheel brake connection is ventilated. The same also applies to a venting position of the main valve, in which it can be decided by the first and second brake valves whether and the extent to which the first or second wheel brake connection should be vented.

In a further preferred embodiment, the first brake valve has a first brake valve control connection, at which a first control pressure can be controlled by the pilot control unit, connected to the pilot control unit. In a first pressureless switching position of the first brake valve, the first brake valve connection is preferably connected to the second brake valve connection and the first brake valve is closed in a second switching position. This means that once the first control pressure exceeds a predetermined threshold value of the first brake valve, the first brake valve switches to a closed switching position. In this way, the first wheel brake connection can be vented in a pressureless switching position, if the first control pressure is lost, and the application of a corresponding wheel brake is thus prevented in the event of a loss of the control pressure. In a consistent manner, the second brake valve preferably also has a second brake valve control unit connected to the pilot control unit, at which a second control pressure can be controlled by the pilot control unit. Also, the second brake valve is preferably open in a first pressureless switching position, so that the third brake valve connection is connected to the fourth brake valve connection and is closed in a second switching position. The same preferably applies to the second brake valve as to the first brake valve. In this respect, the second brake valve also switches to the closed switching position if the second control pressure exceeds a predetermined threshold value of the second brake valve.

In a preferred embodiment of the invention, the pilot control unit has a main control valve, which has a main control valve connection connected to the supply connection, a second main control valve connection connected to the main valve control connection and a third main control valve connection connected to a vent. The first main control valve is therefore preferably used to control the main valve. This means that only one control valve is provided for the main valve, namely the first main control valve, so that a control valve can be omitted in the pilot control unit.

Preferably, the pilot control unit also has a first brake control valve for the first brake pressure, which has a first brake control valve connection connected to the supply connection, a second brake control valve connection connected to the first brake valve control connection and a third brake control valve connection connected to a vent. The first brake control valve is therefore provided for the first brake valve and provides the appropriate first control pressure for it.

In a corresponding manner, the pilot control unit preferably also has a second brake control valve, which is provided for the second brake pressure. The second brake control valve preferably has a fourth brake control valve connection connected to the supply connection, a fifth brake control valve connection connected to the second brake valve control connection and a sixth brake control valve connection connected to a vent.

Furthermore, the electropneumatic brake control module preferably has an electrical control unit with an electrical connection for receiving braking signals and for providing corresponding switching signals at least to the pilot control unit. The valves of the pilot control unit, i.e. the main control valve, the first brake control valve and the second brake control valve are preferably electromagnetically switchable based on a first switching signal, a second switching signal and a main switching signal. These signals are preferably provided by the electrical control unit. The electrical connection can be used to connect the electrical control unit to a BUS system of the vehicle, or directly to a higher-level control unit, for example a central module. At the electrical connection, electrical signals can be directly received, which cause the switching of valves, or only a brake demand signal, which is then converted by the electronic control unit into corresponding switching signals, with determination of a setpoint brake pressure.

Furthermore, it is preferred that the electropneumatic brake control module has a first pressure sensor, which is provided to detect the first brake pressure and to provide a corresponding first pressure signal, and a second pressure sensor, which is provided to detect the second brake pressure and to provide a corresponding second pressure signal. Both the first and the second pressure signals are preferably provided by the corresponding pressure sensors to the electrical control unit. This allows pressure control to be carried out for the first and second wheel brake connections. The electrical control unit can also pass on the first and second pressure signals to higher-level control units, such as the central module.

In a second aspect of the invention, the above-mentioned object is achieved by a method for operating an electropneumatic brake control system module according to one of the above described preferred embodiments of an electropneumatic brake control module and according to the first aspect of the invention. The method has the steps: receiving a braking signal; depending on the received braking signal: controlling a first brake pressure at the first wheel brake connection; and controlling a second brake pressure at the second wheel brake connection, which is independent of the first brake pressure. Preferably, the braking signal is provided by a central module or another higher-level module.

In a third aspect of the invention, the above-mentioned object is achieved by a vehicle, in particular a commercial vehicle, with an electropneumatic brake control module according to one of the above-described preferred embodiments of an electropneumatic brake control module according to the first aspect of the invention, which is suitable for carrying out the method according to the second aspect of the invention.

It should be understood that the electropneumatic brake control module according to the first aspect of the invention, the method according to the second aspect of the invention and the vehicle according to the third aspect of the invention have the same and similar sub-aspects as are laid down in particular in the dependent claims. In this respect, reference is made in full to the above description of individual features and their combination as well as their advantages, since these also form preferred embodiments in the second and third aspects of the invention.

An embodiment of the invention is now described below on the basis of the drawings. This is not necessarily intended to represent the embodiment to scale, but rather the drawings are executed in a schematic form. With regard to additions to the teaching directly recognizable from the drawing, reference is made to the relevant prior art. It must be taken into account that various modifications and changes regarding the form and detail of an embodiment can be made without deviating from the general idea of the invention. The features of the invention disclosed in the description, in the drawings and in the claims may be essential for the further development of the invention, both individually and in any combination. In addition, all combinations of at least two of the features disclosed in the description, the drawings and/or the claims fall within the scope of the invention. The general idea of the invention is not limited to the exact form or detail of the preferred embodiment shown and described below or limited to an object which would be limited in comparison to the subject matter claimed in the claims.

Further advantages, features, and details of the invention result from the following description of the preferred embodiment as well as on the basis of the drawings.

Figure 1:
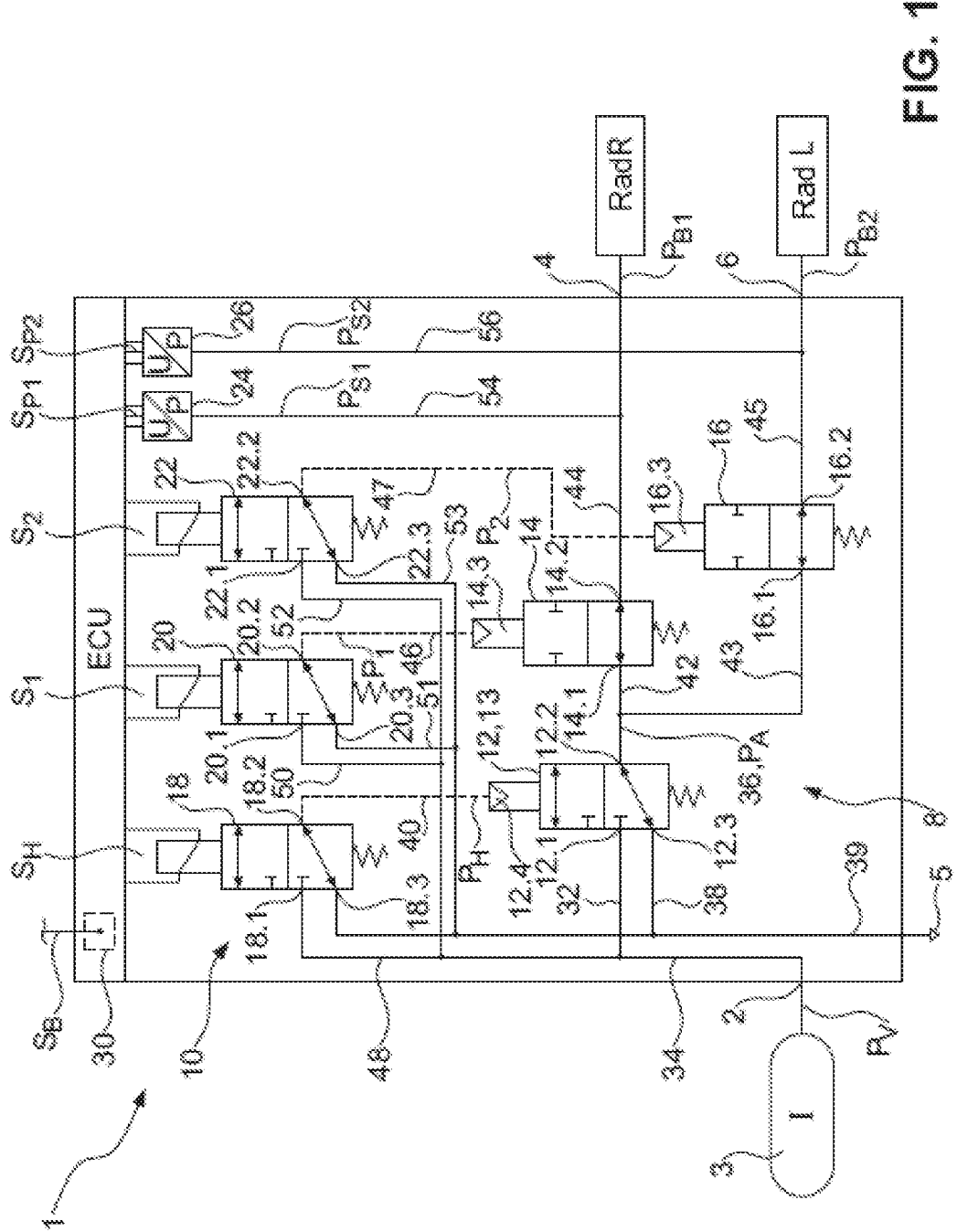
FIG. 1 shows an exemplary embodiment of the invention.

According to FIG. 1, an electropneumatic brake control module 1 has a supply connection 2 for connecting a compressed air supply 3. The compressed air supply 3 provides a supply pressure at the supply connection 2.

Furthermore, the electropneumatic brake control module 1 has a first wheel brake connection 4 and a second wheel brake connection 6, which are provided for two wheels of an axle. By way of example, in FIG. 1 the first wheel brake connection 4 is provided for a right wheel 65a (in the direction of travel) (cf. FIG. 2), while the second wheel brake connection 6 is provided for a left wheel 65b (in the direction of travel).

The electropneumatic brake control module 1 is used to divide a brake signal SB into a first brake pressure pB1 and a second brake pressure pB2 for the first and second wheel brake connections 4, 6. Thus, individual wheel braking and control of the first and second brake pressures pB1, pB2 is possible.

For this purpose, the electropneumatic brake control module 1 has an inlet-outlet valve unit 8, which in this case is designed to be purely pneumatically controlled. To control this pneumatically controlled inlet-outlet valve unit 8, the electropneumatic brake control module 1 has an electropneumatic pilot control unit 10. The electropneumatic pilot control unit 10 receives suitable switching signals S1, S2, SH, which are described in more detail below, from an electrical control unit ECU. Based on this, the electropneumatic pilot control unit 10 controls the control pressures p1, p2, pH, which are then converted by the inlet-outlet valve unit 8.

In detail, the inlet-outlet valve unit 8 has a main valve 12, which in this exemplary embodiment is in the form of a pneumatically switched 3/2-way valve 13. The main valve 12 has a main valve supply connection 12.1, a main valve working connection 12.2, a main valve venting connection 12.3 and a main valve control connection 12.4. The main valve supply connection 12.1 is connected to a first pneumatic line 32, which branches off from a supply distribution line 34, which in turn is connected to the supply connection 2. The supply pressure pV is therefore applied at the main valve supply connection. The main valve working connection 12.2 is connected to a working pressure line 36, in which a working pressure pA is controlled by the main valve 12. The main valve venting connection 12.3 is connected to a first venting line 38, which opens into a main venting line 39, which in turn is connected to a vent 5. The main valve control connection 12.4 is connected to a main control line 40, through which a main control pressure pH can be controlled at the main valve control connection 12.4.

The main valve 12 is in the form of a 3/2-way valve 13 and therefore has two switching positions. In a first switching position shown in FIG. 1, the main valve working connection 12.2 is connected to the main valve venting connection 12.3, so that the working pressure line 36 is vented. Once the main control pressure pH exceeds a predetermined threshold value of the main valve 12, the main valve 12 switches to the second switching position, which is not shown in FIG. 1, in which the main valve working connection 12.2 is connected to the main valve supply connection 12.1, so that the supply pressure pV is fed through by the main valve 12 and is controlled as the working pressure pA in the working pressure line 36.

The inlet-outlet valve unit 8 also has a first brake valve 14 and a second brake valve 16. The first and second brake valves 14, 16 are used to control the working pressure pA as required as the first and second brake pressures pB1, pB2 to the corresponding first and second wheel brake connections 4, 6. Both the first and the second brake valves 14, 16 are designed as pneumatically switchable 2/2-way valves. The first brake valve 14 has a first brake valve connection 14.1 and a second brake valve connection 14.2. The first brake valve connection 14.1 is connected to a first working distribution line 42, which branches off from the working pressure line 36. The first brake valve connection 14.1 is therefore connected to the main valve 12. The second brake valve connection 14.2 is connected to a first brake pressure line 44, which in turn is connected to the first wheel brake connection 4. The first brake valve 14 thus controls the first brake pressure pB1 into the first brake pressure line 44 from the second brake valve connection 14.2.

Similarly, the second brake valve 16 has a third brake valve connection 16.1 and a fourth brake valve connection 16.2. The third brake valve connection 16.1 is connected to a second working distribution line 43, which also branches off from the first working pressure line 36. In this respect, the third brake valve connection 16.1 is connected to the main valve 12. The fourth brake valve connection 16.2 is connected to a second brake pressure line 45, which in turn is connected to the second brake pressure connection 6. The second brake valve 16 thus controls the second brake pressure pB2 in the second brake pressure line 45.

Both the first brake valve 14 and the second brake valve 16 are pneumatically switchable and in this respect the first brake valve 14 has a first brake valve control connection 14.3 which is connected to the pilot control unit, and at which a first control pressure p1 can be controlled by the pilot control unit 10. For this purpose, the first brake valve control connection 14.3 is connected to a first control line 46. The first brake valve 14 is preferably pressureless in an open switching position shown in FIG. 1. Once the first control pressure p1 exceeds a predetermined threshold value of the first brake valve, the first brake valve 14 switches to the closed switching position, which is not shown in FIG. 1, in which the first brake valve connection 14.1 and the second brake valve connection 14.2 are separated.

In a consistent manner, the second brake valve 16 has a second brake valve control connection 16.3, which is connected to the pilot control unit 10. A second control pressure P2 is controlled at the second brake valve control connection 16.3 by the pilot control unit 10. For this purpose, the second brake valve control connection 16.3 is connected to a second control line 47. The second brake valve 16 is also preferably open in a pressureless switching position shown in FIG. 1. Once the second control pressure p2 exceeds a predetermined threshold value of the second brake valve 16, the second brake valve 16 switches to the closed switching position, which is not shown in FIG. 1, in which the third brake valve connection 16.1 and the fourth brake valve connection 16.2 are separated.

The pilot control unit 10 has three valves in this exemplary embodiment, each of which controls a control pressure p1, p2, pH. For the main valve 12, the pilot control unit 10 has a main control valve 18. The main control valve 18 is designed as an electrically switchable 3/2-way valve and has a first main control valve connection 18.1, a second main control valve connection 18.2 and a third main control valve connection 18.3. The first main control valve connection 18.1 is connected to a second pneumatic line 48, which branches off from the supply distribution line 34, so that the supply pressure pV is applied at the first main control valve connection 18.1. The second main control valve connection 18.2 is connected to the main control pressure line 40 and thus controls the main control pressure PH in this. The third main control valve connection 18.3 is connected to a second venting line 49, which opens into the main venting line. The main control valve 18 is preferably deenergized in a first switching position shown in FIG. 1, in which the second main control valve connection 18.2 is connected to the third main control valve connection 18.3, and the main control pressure line 40 is thus vented. Once the main switching signal SH is provided by the electrical control unit ECU, the main control valve 18 switches to the second switching position, which is not shown in FIG. 1, and the first main control valve connection 18.1 is connected to the second main control valve connection 18.2, so that as a result the main control pressure pH is controlled in the main control line 40 and therefore at the main valve control connection 12.4.

The pilot control unit 10 also has a first brake control valve 20 for the first brake valve 14 and a second brake control valve 22 for the second brake valve 16. Both the first brake control valve 20 and the second brake control valve 22 are designed as electrically switchable 3/2-way valves.

The first brake control valve 20 accordingly has a first brake control valve connection 20.1, a second brake control valve connection 20.2 and a third brake control valve connection 20.3. The first brake control valve connection 20.1 is connected to a third pneumatic line 50, which branches off from the supply distribution line 34. Thus, the supply pressure pV is applied at the first brake control valve connection 20.1. The second brake control valve connection 20.2 is connected to the first control pressure line 46, so that the first control pressure p1 is controlled in the first control line 46 thereby. The third brake control valve connection 20.3 is connected to a third venting line 51, which opens into the main venting line 39. The first brake control valve 20 is preferably deenergized in the first switching position, which is not shown in FIG. 1, in which the second brake control valve connection 20.2 is connected to the third brake control valve connection 20.3, so that the first control pressure line 46 is vented. Once the first switching signal S1 is provided by the electrical control unit ECU, the first brake control valve switches to the second switching position, which is not shown in FIG. 1, in which the first brake control valve connection 20.1 is connected to the second brake control valve connection 20.2. As a result, the first control pressure p1 is controlled in the first control pressure line 46 and is therefore provided at the first brake valve control connection 14.3.

Similarly, the second brake control valve 22 has a fourth brake control valve connection 22.1, a fifth brake control valve connection 22.2 and a sixth brake control valve connection 22.3. The fourth brake control valve connection 22.1 is connected to a fourth pneumatic line 52, which branches off from the supply distribution line 34, so that the supply pressure pV is applied at the fourth brake control valve connection 22.1. The fifth brake control valve connection 22.2 is connected to the second control pressure line 47 and controls the second control pressure p2 therein. The sixth brake control valve connection 22.3 is connected to a fourth venting line 53, which in turn opens into the main venting line 39. The second brake control valve 22 is preferably deenergized in the first switching position shown in FIG. 1, in which the fifth brake control valve connection 22.2 is connected to the sixth brake control valve connection 22.3, therefore the second control pressure line 47 is vented. Once the second switching signal S2 is provided by the electrical control unit ECU, the second brake control valve 22 switches to the second switching position, which is not shown in FIG. 1, and the fifth brake control valve connection 22.2 is connected to the fourth brake control valve connection 22.1, so that the second control pressure p2 is controlled in the second control pressure line 47 and as a result is applied at the second brake valve control connection 16.3.

To control the first and second brake pressures pB1, pB2, the process is as follows: Once the brake signal SB is provided at the electrical connection 30 of the ECU, the main switching signal SH is first output, as a result of which the main control pressure pH is controlled and the main valve 12 switches to the second switching position, which is not shown in FIG. 1. The working pressure pA is controlled in the working pressure line 36 and is applied at both the first brake valve connection 14.1 and the third brake valve connection 16.1. If both valves, both the first and the second brake valves 14, 16, are in the open switching position shown in FIG. 1, the brake pressures pB1, pB2 are controlled in the same direction in the same way. However, if one of the first and second brake pressures pB1, pB2 is higher or lower than the other of the first and second brake pressures pB1, pB2, one of the first and second brake valves 14, 16 can be closed by providing the first or second switching signal S1, S1. If the first and second brake pressures pB1, pB2 are to be maintained, the first and second brake valves 14, 16 are closed following control of the working pressure pA, so that the first and second brake pressures pB1, pB2 are locked in. Now the main switching signal SH can be switched off, so that the main valve 12 reverts to the first switching position shown in FIG. 1 and the working pressure line 36 is vented. By suitably switching the first and second brake valves 14, 16 by providing the first and second switching signals S1, S2 and controlling the first second control pressures p1, p2, the first and second wheel brake connections 4, 6 can now be vented (also vented in stages) to reduce the first second brake pressures pB1, pB2.

The main valve 12 is thus used in this embodiment both for ventilation of the first and second wheel brake connections 4, 6 as well as for venting. The main valve 12 thus provides a common ventilation and venting valve for both the first and second wheel brake connections 4, 6.

All in all, a main valve as well as the corresponding pilot valve and the end stages in the electrical control unit ECU can be omitted compared to the prior art.

Furthermore, FIG. 1 shows that the electropneumatic brake control module 1 has a first pressure sensor 24 and a second pressure sensor 26. The first pressure sensor 24 is connected via a first pressure measuring line 54 to the first brake pressure line 44, and the second pressure sensor 26 is connected via a second pressure measuring line 56 to the second brake pressure line 45. The first brake pressure pB1 is thus applied in the first pressure measuring line 54 and the second brake pressure pB2 is applied in the second pressure measuring line. The first and second pressure sensors 24, 26 preferably provide corresponding first and second pressure signals SP1, SP2 to the electrical control unit ECU, which can then process these and/or can provide them to a higher-level unit, such as a central module 68 (cf. FIG. 2).

Figure 2:
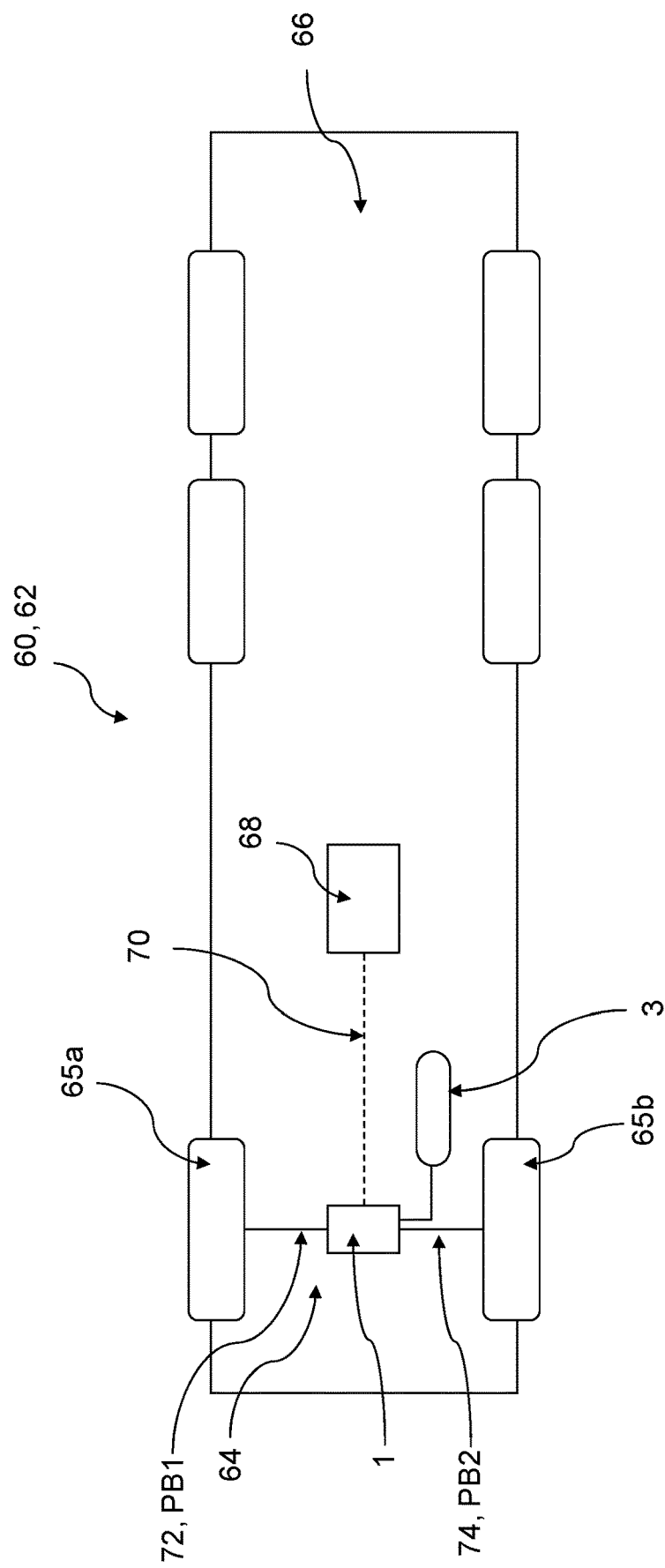
FIG. 2 shows a schematic view of a vehicle.

FIG. 2 now shows a vehicle 60, more precisely a commercial vehicle 62, with a front axle 64 for a right wheel 65*a* and a left wheel 65*b*. In addition, the commercial vehicle has two rear axles 66, which are not discussed further below. The commercial vehicle 62 has a central module 68, which is connected to the electropneumatic brake control module 1, which acts here as a front axle modulator, via a vehicle BUS 70. A braking demand signal BS is provided via the vehicle BUS and is then processed by the electropneumatic brake control module 1 in the manner described above. As a result, the first brake pressure BP1 is controlled at a wheel brake of the right wheel 65*a* via a first brake line 72, and the second brake pressure BP2 is controlled at a wheel brake of the left wheel 65*b* via a second brake line 74.

What is claimed is:

1. An electropneumatic brake control module (1), comprising:
    a supply connection (2) for connecting a compressed air supply (3);
    a first wheel brake connection (4) and a second wheel brake connection (6);
    a pneumatically controlled inlet-outlet valve unit (8) for controlling a first brake pressure (PB1) at the first wheel brake connection (4) and a second brake pressure (PB2) at the second wheel brake connection (6), which is independent of the first brake pressure (PB1); and
    an electropneumatic pilot control unit (10) for controlling at least one main control pressure (PH) at a main valve (12) of the inlet-outlet valve unit (8),
    wherein the main valve (12) of the inlet-outlet valve unit (8) is a pneumatically controllable 3/2-way valve (13) with a main valve control connection (12.4);
    wherein the main valve (12) comprises a main valve supply connection (12.1) connected to the supply connection (2), a main valve working connection (12.2) for controlling a working pressure (PA), and a main valve venting connection (12.3) connected to a vent (5).

2. The electropneumatic brake control module (1) as claimed in claim 1, wherein in a first pressureless switching position of the main valve, the main valve working connection (12.2) is connected to the main valve venting connection (12.3), and in a second switching position of the main valve the main valve working connection (12.2) is connected to the main valve supply connection (12.1).

3. The electropneumatic brake control module (1) as claimed in claim 2, wherein the inlet-outlet valve unit (8) has a first brake valve (14) for controlling the first brake pressure (PB1) and a second brake valve (16) for controlling the second brake pressure (PB2), and wherein
    the first brake valve (14) has a first brake valve connection (14.1) connected to the main valve working connection (12.2) of the main valve (12) and a second brake valve connection (14.2) connected to the first wheel brake connection (4); and
    the second brake valve (16) has a third brake valve connection (16.1) connected to the main valve working connection (12.2) of the main valve (12) and a fourth brake valve connection (16.2) connected to the second wheel brake connection (6).

4. The electropneumatic brake control module (1) as claimed in claim 3, wherein the first brake valve (14) has a first brake valve control connection (14.3), at which a first control pressure (P1) is configured to be controlled by the pilot control unit (10), and which is connected to the pilot control unit (10).

5. The electropneumatic brake control module (1) as claimed in claim 4, wherein in a first pressureless switching position of the first brake valve (14), the first brake valve connection (14.1) is connected to the second brake valve connection (14.2), and in a second switching position of the first brake valve (14), the first brake valve (14) is closed.

6. The electropneumatic brake control module (1) as claimed in claim 4, wherein the pilot control unit (10) has a first brake control valve (20) for the first brake pressure (PB1), which has a first brake control valve connection (20.1) connected to the supply connection (2), a second brake control valve connection (20.2) connected to the first brake valve control connection (14.3), and a third brake control valve connection (20.3) connected to a vent (5).

7. The electropneumatic brake control module (1) as claimed in claim 3, wherein the second brake valve (16) has a second brake valve control connection (16.3), at which a second control pressure (P2) can be controlled by the pilot control unit (10), and which is connected to the pilot control unit (10).

8. The electropneumatic brake control module (1) as claimed in claim 7, wherein in a first pressureless switching position of the second brake valve (16), the third brake valve connection (16.1) is connected to the fourth brake valve connection (16.2), and in a second switching position of the second brake valve (16), the second brake valve (16) is closed.

9. The electropneumatic brake control module (1) as claimed in claim 7, wherein the pilot control unit (10) has a second brake control valve (22) for the second brake pressure (PB2), which has a fourth brake control valve connection (22.1) connected to the supply connection (2), a fifth brake control valve connection (22.2) connected to the second brake valve control connection (16.3) and a sixth brake control valve connection (22.3) connected to a vent (5).

10. The electropneumatic brake control module (1) as claimed in claim 1, wherein the inlet-outlet valve unit (8) has a first brake valve (14) for controlling the first brake pressure (PB1) and a second brake valve (16) for controlling the second brake pressure (PB2).

11. The electropneumatic brake control module (1) as claimed in claim 1, wherein the pilot control unit (10) has a main control valve (18), which has a first main control valve connection (18.1) connected to the supply connection (2), a second main control valve connection (18.2) connected to the main valve control connection (12.4) and a third main control valve connection (18.3) connected to a vent (5).

12. The electropneumatic brake control module (1) as claimed in claim 1, further comprising an electrical control unit (ECU) with an electrical connection (30) for receiving braking signals (SB) and for providing corresponding switching signals (SH, S1, S2) at least to the pilot control unit (10).

13. The electropneumatic brake control module (1) as claimed in claim 1, further comprising a first pressure sensor (24), which is provided to detect the first brake pressure (PB1) and to provide a corresponding first pressure signal (SP1), as well as a second pressure sensor (26) which is provided to detect the second brake pressure (PB2) and to provide a corresponding second pressure signal (SP2).

14. A vehicle (60) with an electropneumatic brake control module (1) as claimed in claim 1.

15. A method for operating an electropneumatic brake control module (1) having
    a supply connection (2) for connecting a compressed air supply (3);
    a first wheel brake connection (4) and a second wheel brake connection (6);
    a pneumatically controlled inlet-outlet valve unit (8) for controlling a first brake pressure (PB1) at the first wheel brake connection (4) and a second brake pressure (PB2) at the second wheel brake connection (6), which is independent of the first brake pressure (PB1); and
    an electropneumatic pilot control unit (10) for controlling at least one main control pressure (PH) at a main valve (12) of the inlet-outlet valve unit (8),
    wherein the main valve (12) of the inlet-outlet valve unit (8) is a pneumatically controllable 3/2-way valve (13) with a main valve control connection (12.4);
    wherein the main valve (12) comprises a main valve supply connection (12.1) connected to the supply connection (2), a main valve working connection (12.2) for controlling a working pressure (PA), and a main valve venting connection (12.3) connected to a vent (5);

the method comprising the following steps:

receiving a braking signal (SB);

depending on the received braking signal (SB):

controlling the first brake pressure (PB1) at the first wheel brake connection (4); and controlling the second brake pressure (PB2) at the second wheel brake (6).

* * * * *